United States Patent
Sweet

[11] 3,757,818
[45] Sept. 11, 1973

[54] SAFETY CONTROL VALVE SYSTEM FOR FLUID ACTUATED DEVICES

[75] Inventor: Roger L. Sweet, Royal Oak, Mich.

[73] Assignee: Ross Operating Valve Company, Detroit, Mich.

[22] Filed: July 26, 1971

[21] Appl. No.: 165,967

[52] U.S. Cl. .................... 137/596.16, 137/596.16
[51] Int. Cl. ......................................... F16k 11/10
[58] Field of Search ................. 137/596.16, 596.14, 137/596.15, 596.12, 596.17, 596; 91/6, 43.3, 459, 461, 426, 444, 448

[56] References Cited
UNITED STATES PATENTS

| 3,670,767 | 6/1972 | Mahorney | 137/596 |
| 3,265,089 | 8/1966 | Nill | 137/596.16 |
| 3,043,335 | 7/1962 | Hunt | 137/596.15 |
| 2,611,391 | 9/1952 | Sainsbury et al. | 137/596.15 |
| 2,754,840 | 7/1956 | Hicks, Jr. | 137/596.15 X |

Primary Examiner—Henry T. Klinksiek
Assistant Examiner—Robert J. Miller
Attorney—J. King Harness et al.

[57] ABSTRACT

Two normally closed three-way main valves are connected in series to supply fluid to an outlet port. When moved to their closed positions, the valves provide parallel connections from the outlet port to exhaust. Therefore, if either valve is stuck in an open or partially open position, movement of the other valve to its closed position will provide good exhausting capacity. Furthermore, there will be no substantial pressure at the outlet port until both valves are actuated to their open position. Movement of either valve to its exhaust position will completely stop the supply of air to the outlet port and provide a direct exhaust connection.

3 Claims, 1 Drawing Figure

3,757,818
PATENTED SEP 11 1973
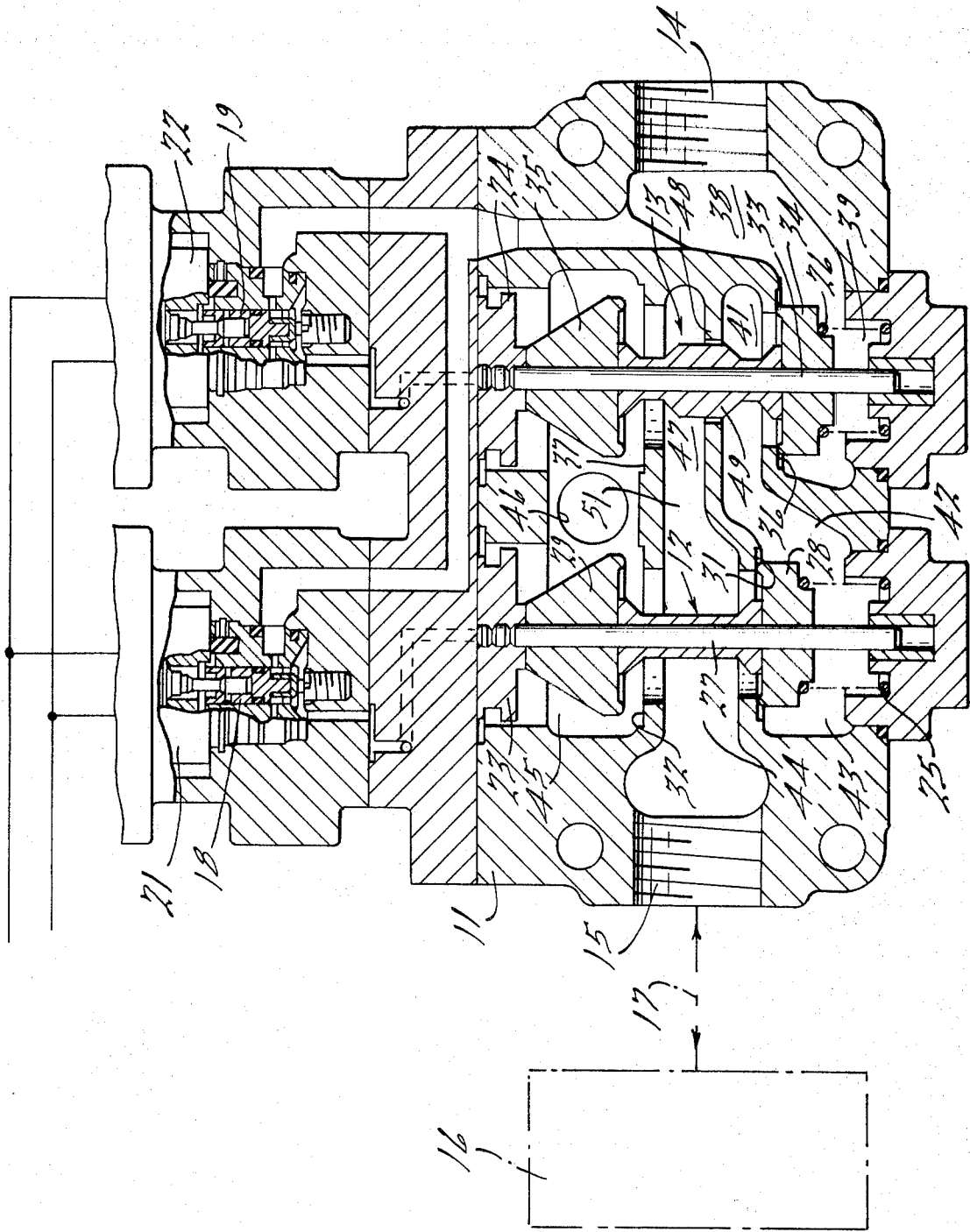
INVENTOR.
Roger L. Sweet

SAFETY CONTROL VALVE SYSTEM FOR FLUID ACTUATED DEVICES

BACKGROUND OF THE INVENTION

1. Field of the Invention

The invention relates to control systems for fluid actuated devices, such as that shown in Di Tirro et al. U.S. Pat. No. 2,906,246. In such systems, used for example to control the clutches of press brakes, normally closed main valves are provided, these valves being pilot controlled to move simultaneously between supply and exhaust positions. When either valve malfunctions by not moving fully to its exhaust position, movement of the other valve to its exhaust position will supposedly exhaust the outlet port leading to the clutch, therefore stopping the press. The Di Tirro patent also discloses a safety valve responsive to discrepant positions between the main valves to disenable the control system. However, the present invention is not concerned with this additional safety feature but only the basic two-valve control system itself.

2. Description of the Prior Art

Two basic arrangements are known for the main valves. In one arrangement, exemplified by the main valves in the abovementioned Di Tirro et al. patent, the valves are in parallel. In this basic system, if one valve is stuck in a partially or fully open position, the valve which moves to its closed or exhaust position must dump not only air from the press clutch motor but also from the stuck main valve. This might result in residual pressure remaining at the outlet port, an unsatisfactory condition since in some cases the press might continue to recycle with this partial pressure being supplied.

The other basic arrangement has the main valves in series. With this system, there is a positive supply cutoff when one valve fails in a partially open position and the other moves to a closed position. However, it has been found that if the valve which fails in the open position is the downstream valve, the exhausting of the outlet port is sometimes not fast enough because it must follow a tortuous flow path through the inlet of the downstream valve.

BRIEF SUMMARY OF THE INVENTION

According to the present invention, the advantages of both systems are combined and their disadvantages eliminated, by so constructing the valves and their connections that the supply to the outlet port is in series, whereas the exhausting is in parallel. This is done in the illustrated embodiment by providing an additional exhaust flow path directly from the central chamber between the valve members, and sealing off this central chamber from the supply passage. Thus, in case of failure of either valve by being stuck in a partially open position, movement of the remaining valve to a closed or exhaust position will not only completely cut off supply fluid to the outlet port, but will provide a direct exhaust connection of substantial capacity so that no substantial downstream pressure will remain at the outlet port. Positive stopping and decycling of the press will thus be assured.

BRIEF DESCRIPTION OF THE DRAWINGS

The FIGURE is a cross-sectional view of the safety control valve system with the valves shown in their normally closed or exhaust positions.

DESCRIPTION OF THE PREFERRED EMBODIMENT

The control system comprises a housing 11 enclosing two normally closed three-way poppet valves generally indicated at 12 and 13 respectively. The housing has a supply port 14 at one end and an outlet port 15 at the other. The outlet port is connected, for example, to a press clutch actuator schematically shown at 16. Conventionally, pressure in line 17 which connects port 15 to actuator 16 will cause the press to operate, whereas lack of pressure in line 17 will stop the press after it has completed its cycle. It is desirable to discontinue press cycling when there is any malfunction in the control valve system, such as full or partial sticking of either the main or pilot valves in their supply or exhaust positions.

Main valves 12 and 13 are controlled by pilot valves 18 and 19 respectively. These are shown as normally closed solenoid-operated valves. With solenoids 21 and 22 deenergized, valves 18 and 19 will be in their exhaust positions, evacuating the chambers of actuating pistons 23 and 24 for valves 12 and 13 respectively. As will be explained more fully below, this will permit springs 25 and 26 to urge valves 12 and 13 to their exhaust positions. When solenoids 21 and 22 are energized (normally simultaneously) valves 18 and 19 will move to their supply positions, pressurizing the chambers of pistons 23 and 24 to move 12 and 13 to their supply positions.

Valve 12 comprises a rod 27 which carries an inlet poppet valve member 28 and an exhaust poppet valve member 29 facing each other. Piston 23 is fixed to the end of rod 27 adjacent valve member 29. Spring 25 normally urges valve member 28 against a seat 31, holding valve member 29 away from its seat 32. Pressurization of the chamber of piston 23 will close valve member 29 and open valve member 28.

Valve 13 comprises a rod 33 carrying an inlet valve member 34 and an exhaust valve member 35 facing each other. Piston 24 is secured to the end of rod 33 adjacent valve member 35. Spring 26 normally urges valve member 34 against its seat 36, with valve member 35 being held away from its seat 37. Pressure in the chamber of piston 24 will close valve member 35 and open valve member 34.

Passage 38 leads from supply port 14 to a chamber 39 below valve seat 36. A chamber 41 is formed above valve seat 36, and a passage 42 leads from this chamber to a chamber 43 below valve seat 31. A chamber 44 above valve seat 31 leads to outlet port 15. It will thus be seen that the supply to port 15 goes in series through valves 12 and 13.

As exhaust chamber 45 extends across the tops of valve seats 32 and 37, leading to an exhaust port 46. A chamber 47 is formed below seat 37 and is separated from chamber 41, in this case by a close fitting portion 48 of the housing which is adjacent an enlarged portion 49 carried by pin 33. A passage 51 leads directly from chamber 44 to chamber 47, so that spaces 44, 47 and 51 form in effect a single chamber. The arrangement is such that when valve 12 is in its exhaust position, fluid will flow from chamber 44 through valve seat 32 to chamber 45 and out exhaust port 46. When valve 13 is in its exhaust position, fluid will flow directly from chamber 44 through passage 51, chamber 47, and valve seat 37 to chamber 45 and out through exhaust port 46.

The fluid will therefore not have to flow through the supply valve seat of the other main valve, as was the case in the conventional series dual valve arrangement mentioned previously.

In operation, valves 12 and 13 will normally move in unison between their supply and exhaust positions to operate the press. The failure of one or the other of the two main valves could be due to any of a number of circumstances. For example, one of the solenoid-operated pilot valves 18 or 19 could become stuck in either supply or exhaust position, as could either of the two main valves. The net result however will be that one main valve returns to its normal exhaust position while the other remains partially or fully in its supply position.

Taking first, for example, a case where the failure results in valve 13 being held in its supply position, the deenergization of solenoids 20 and 21 will result in valve 12 being moved to its exhaust position. This will completely cut off fluid pressure supply to port 15. At the same time, port 15 will be directly vented through chambers 44 and 45 to port 46, the flow being through valve seat 32. This will prevent the press from recycling and assure full stoppage.

If valve 12 is stuck partially or fully in its supply position, deenergization of solenoids 20 and 21 will result in valve 13 moving fully to its exhaust position. Here again, the supply of pressurized fluid to port 15 will be completely cut off. Furthermore, port 15 will be directly vented through chamber 44, passage 51, and chambers 47 and 45 to port 46. The complete cutoff of supply fluid, plus the direct exhaust path for the outlet port, will result in no substantial pressure being at the outlet port, and the press will therefore stop.

It should be understood that although the invention has been described with respect to press clutches, it has other applications where safety is desired in case of failure of a portion of the control valve system.

I claim:

1. In a safety control valve system for fluid-actuated devices, a housing having a supply port, an outlet port and one or more exhaust ports, first and second normally closed three-way valves in said housing, each valve having supply and exhaust valve members, said valves being piston-operated, means connecting the supply valve members of said first and second valves in series between said supply and outlet ports, means connecting the exhaust valve members of said first and second valves in parallel between said outlet and exhaust ports, whereby the movement of either valve to its exhaust position when the other valve remains partially or fully in its supply position will result in a complete cutoff of fluid pressure from the supply to the outlet port and a direct connection from the outlet port to at least one of the exhaust ports through said parallel connecting means, and two normally closed pilot valves having outlet ports connected to the chambers of said pistons.

2. In a safety control valve system for fluid-actuated devices, a housing having a supply port, an outlet port and an exhaust port first and second normally closed poppet valves in said housing, each poppet valve having facing supply and exhaust valve members with a chamber therebetween common to both valves and connected to the outlet port, passageways connecting the supply valve members of both valves in series between said supply and outlet ports, a common exhaust chamber for both valves leading to the exhaust port, said common chamber being connected to the exhaust valve members of both valves in parallel and being separated from said passageway means, whereby a direct exhaust passage will be provided between the outlet port and exhaust port when either valve is in its exhaust position through said common exhaust chamber, each of said valves comprising a rod carrying said supply and exhaust valve members, springs urging said valve members toward their closed positions, and pistons adjacent said exhaust valve members for moving the valve members toward their open positions.

3. The combination according to claim 2, further provided with two solenoid-operated normally closed pilot valves mounted on said housing and having outlet ports connected to the chambers of said pistons.

* * * * *